June 13, 1950 C. A. ROSENCRANS 2,511,789
FREQUENCY MODULATION SYSTEM
Filed Nov. 2, 1946
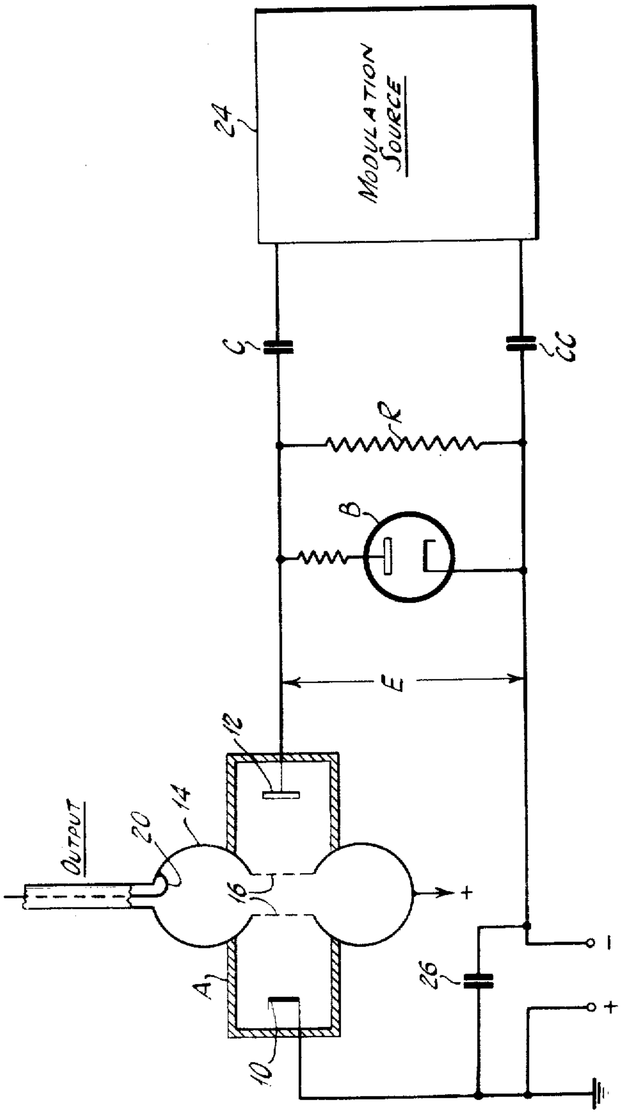
INVENTOR.
CHARLES A. ROSENCRANS
BY
H. S. Grover
ATTORNEY.

Patented June 13, 1950 2,511,789

UNITED STATES PATENT OFFICE 2,511,789

FREQUENCY MODULATION SYSTEM

Charles A. Rosencrans, Haddonfield, N. J., assignor to Radio Corporation of America, a corporation of Delaware Application November 2, 1946, Serial No. 707,515

9 Claims. (Cl. 332—7)

This application concerns frequency modulation of ultra high frequency oscillation generators and has as its general object improved frequency modulation of ultra high frequency oscillators through a wide range of frequencies in accordance with video, facsimile or voice signals.

A more specific object of the invention is wide band modulation of ultra high frequency oscillation generators wherein the resulting frequency modulation bears a special relationship to the modulating currents or voltage.

In frequency modulation receivers as known today, demodulation is accomplished by use of a network having a sloping frequency versus voltage characteristic by means of which the frequency deviations are converted to corresponding amplitude and frequency variations. The amplitude variations are then detected to recover the signals. Conrad's U. S. Patent 2,047,640, dated October 13, 1936, is illustrative of a balanced discriminator of the off-tuned type while Seeley's Patent 2,121,103, dated June 21, 1938, is illustrative of another type of balanced discriminator circuit. Both, however, have the sloping network described above and if the frequency of the signal currents applied to the network is not centered on a linear portion of the sloping characteristic and at the crossing point in the balanced system, distortion is likely to result in the receiver output. The transmitter signal may drift and to prevent this drift from resulting in distortion, automatic frequency control means are incorporated in the receiver to insure an output IF to the discriminator, the frequency of which is centered on the linear portion of the frequency versus voltage characteristic of the discriminator and further, when a balanced discriminator is used on the crossing point of the characteristics.

The automatic frequency control potential is usually obtained by rectifying the signal modulation at the receiver and passing the rectified current through a resistor to derive a potential drop which is a measure of the average modulation strength. Since the derived potential is a measure of the average modulation strength, it changes when the character of the modulation changes. For example, this direct current potential is for one value for a music program and at another value for voice program and yet another value for video or facsimile. The potential variations operate through the automatic frequency control circuits to retune the receiver and thereby shift its point of operation on the discriminator characteristic curve and in many cases, cause the operation to take place along a non-linear part of the discriminator characteristic. This dependence of the tuning of the receiver on the average signal strength is undesirable in all frequency modulation systems, and in particular, in video facsimile and the like frequency modulation systems.

A further object of my invention is to provide a frequency modulation system of a simple type wherein the modulation process is so accomplished that the automatic frequency control potential of the receiver is of a fixed value and does not depend on average modulation strength which per se is variable.

A further object of my invention is to provide improved means for modulating an ultra high frequency oscillator of the reflex Klystron type in such a manner that the frequency swing at one extreme position always reaches a fixed value which may be pre-set if desired with respect to the receiver discriminator characteristics so that the receiver always operates on the best part of its characteristic curve. In other words, I provide a fixed stable point of signal voltage or current to which the automatic frequency control system at the receiver may be referred. This point of operation is then such that the modulation sweeps the frequency at the receiver along the linear portion of the discriminator circuit so that the useful output is always a faithful reproduction of the original signal and if automatic frequency control is used in the receiver, the frequency of the current fed to the discriminator is fixed as desired.

These objects are accomplished in accordance with my invention by applying the modulation to the Klystron reflector electrode and rectifying peaks of the modulation such as, for example, the synchronizing peaks in a slow time constant network to provide a supplemental potential which is added to the direct current source potential for the reflector electrode to hold the potential on the reflector electrode as desired. The modulation voltage swings in the other direction are ineffective on the rectifier and the reflex electrode is at one of its extreme direct current potentials so that modulation thereof by said modulation swings take place in a direction to reduce this extreme potential. In the embodiment being described, it is assumed the peaks are positive and represent the synchronizing pulses which are of fixed positive recurring values. The image modulations are white and negative. The peaks are rectified to provide a negative potential which is added to the potential supplied to the reflector electrode from a D. C. source. This is the potential at which the Klystron generates the fixed frequency to which the receiver automatic frequency control system may be referred. If the video signal is modulated in accordance with an image, the modulation is negative with respect to the synchronizing peaks under the conditions assumed here and modulation from the said base or reference value is in a negative direction to increase the Klystron frequency. The invention applies equally well to voice and like modulation in which case the modulation peaks in one direction of swing are rectified to set the said base value from which modulation takes place in the other direction.

In describing my invention in detail, reference will be made to the attached drawings wherein the single figure illustrates my improved modulation system applied to a Klystron oscillator.

In the drawing, A represents in general a Klystron tube having a cathode 10 supplying an electron stream pulled toward reflector electrode 12 by the positive potential on the toroidal shaped closure member 14. In passing through the grids 16, wave energy is developed. The anode 12 has applied thereto a negative potential, through resistor R, which repels the electron stream back through the grids 16 to provide in the chamber 14 in a known manner, oscillatory energy of a frequency depending on the tube's dimensions, electrode spacing and so forth and also on the negative potential applied to the repeller electrode 12. The oscillatory energy or some thereof may be extracted for use by a loop 20 in the chamber 16 connected by a line to the utilizing means, not shown.

Modulation of the frequency of the oscillations generated is accomplished by application of modulating potentials from a source 24 by coupling condenser C to the reflector electrode 12 to modulate its potential with respect to the cathode 10 potential. The modulation circuit is completed around the D. C. source by coupling condensers CC and 26. To establish the fixed reference frequency value, a rectifier B is connected in shunt to the modulation source and to the anode and cathode of the Klystron with a direct current rectifier circuit including resistor R and an alternating current excitation circuit including condensers C and CC.

In operation, the timing of the oscillatory energy generated in A is modulated or varied in frequency by variation of the repeller electrode 12 potential in accordance with the output of modulation source 24.

In accordance with my invention the frequency variation is made to have the certain relationship to the modulating voltage as described above. As arranged, the positive peaks of the modulation are rectified in B to produce on the left-hand plate of condenser C and across resistor R a negative potential which corresponds to or is fixed by the peak value of the positive peaks regardless of the wave shape, symmetry, or average amplitude of the modulation. The positive peaks are rectified in the tube B and build up a negative potential on its anode. On lesser modulation potential or negative swings, condenser C starts to discharge but the discharge rate is slowed up (by making C and R large) to such an extent that the negative potential on the left plate of capacitor C builds up to a value about equal to the positive peaks of the modulation and stays about there between peaks. The modulation may be voice, video facsimile, etc. Thus, the Klystron generates a corresponding base output frequency representing said peaks regardless of the modulation wave form, symmetry, or average intensity. Here, this would be its lowest frequency.

The negative modulation swings and those of magnitude less than said peak positive value are ineffective on the rectifier and operate only to modulate the potential build-up as described above.

This means that when the modulating signal is derived from a television system the peak of the synchronizing pulses may be made to generate practically the same transmitter frequency (Klystron frequency) that otherwise would be generated by zero modulation. At the same time this frequency is quite independent of the "white" content of the video signal.

The action of the circuit of Fig. 1 is essentially as follows:

Assume the modulation is zero. Then the frequency of the Klystron is determined by E, which is approximately equal to the negative voltage supplied the circuit.

The time constant of the rectifier D. C. load circuit is fixed by the values of R and C and is made long at the lowest repetition rate of the modulation peaks. (R=10 megohms and C=.5 mfd. in a practical circuit.) Now when modulation is applied, it is first rectified by the diode, thus charging C to a negative voltage (with respect to the cathode) fixed by the positive peak of the modulating voltage. The new repeller voltage is now E plus the positive peak value of the modulation. Normal video modulation is such as to make the synchronization positive. Inasmuch as the voltage added to E has the same value as the peak of synchronization, synchronizing peaks now have the same value as E. In other words, inasmuch as the peak-to-peak voltage of the modulation is added to the potential E (algebraic) during modulation, the positive peak of the modulation has the same potential as E before modulation.

The modulation below said peaks then operates in the usual fashion to add to the potential E on the repeller electrode to increase the negative potential on the repeller electrode and thus increase its frequency of operation in accordance with the modulation from its base frequency as established above.

The invention is equally applicable to television or the like systems wherein the synchronizing peaks are in the negative direction and the image is white. Then changes such as reversal of the rectifier polarity, etc. known to those skilled in the art are made.

Advantages to be derived from the use of my system include the following:

I have in effect added a D. C. component in the system which is set as desired with respect to the receiver automatic frequency control circuit and which is fixed as established to insure stable operation. Peaks of synchronizing potentials are always fixed so that this reference point for the receiver AFC is thereby fixed. If my invention is not used, the receiver AFC would operate on the signal average magnitude which changes to change the AFC potential. The setting may be made to one end of the linear part of the receiver discriminator characteristic and modulation caused to take place along the linear part of the characteristic. Thus, the ability of the receiver to handle signals is enhanced and in effect the receiver has more room to handle signal modulations.

What is claimed is:

1. In an ultra high frequency signalling system, an oscillation generator comprising a tube having an electron stream source, an accelerating electrode, a repeller electrode and at least one resonator operating at a frequency depending in part on the electron transit time, resonator dimensions and the potential on said repeller electrode, means for applying modulating potentials to said repeller electrode to modulate the timing of the oscillations generated, apparatus for basing the operation of said system on a fixed frequency established by peaks of the modulation including a rectifier in a slow time constant network connected to said repeller electrode, connections for applying modulation to said rectifier and means for extracting generated energy from said resonator.

2. In an ultra high frequency signalling system, an oscillation generator comprising a tube having an electron stream source, an accelerating electrode, a repeller electrode which is electronegative with respect to the electron stream source and at least one resonator operating at a certain frequency depending in part on the electron transit time, resonator dimensions and the negative potential on said repeller electrode, means for superposing modulating potentials on the negative potential on said repeller electrode to modulate the timing of the oscillations generated, means for establishing a fixed reference frequency of operation of said system which differs from said certain frequency by an amount determined by the magnitude of peaks of the modulation including a rectifier connected in shunt to the said repeller electrode and electron source electrode, means for applying modulation to said rectifier, and an output circuit arranged to extract generated energy from said system.

3. In an ultra high frequency wave generator, a Klystron oscillation generator operating at a frequency depending in part on the potential on its reflector electrode, means for applying modulation potentials to said reflector electrode, and a peak rectifier connected to said reflector electrode and excited by said modulation potentials, said rectifier operating to establish on said reflector an additional potential which is proportional to the modulation peaks.

4. In an ultra high frequency wave generator, a Klystron oscillation generator having a reflector electrode electro-negative relative to its electron stream source electrode, means for applying modulation potentials to the reflector electrode to modulate the timing of the oscillations generated, and a rectifier connected to said reflector electrode and excited by said modulation potentials to set up an additional potential on said reflector which is proportional to the modulation peaks.

5. In an ultra high frequency wave generator, an oscillation generator of the Klystron type having a reflector electrode operated electro-negative relative to its electron source electrode, means for applying modulating potentials from a source to said reflector electrode to modulate the timing of the oscillations generated, and means for stabilizing the operation of said system by establishing a fixed frequency characteristic of peaks of the modulation including a rectifier in a slow time constant network connected to said reflector electrode and excited by the modulation.

6. A system as recited in claim 4 wherein said rectifier is a diode with its anode electrode coupled to the reflector electrode and one side of the modulation source and with its cathode coupled to the electron source electrode and to the other side of the modulation source.

7. In a high frequency signalling system, a tube having an electron stream source, and other electrodes including a control electrode in an alternating current circuit wherein oscillatory energy appears, a source of direct current connected between said control electrode and electron source electrode, means for superposing modulating potentials on the potential on said control electrode to modulate the timing of the oscillations generated, means for establishing a fixed reference frequency of operation of said system which is determined in part by peaks of the modulation including a rectifier having its electrodes connected directly in shunt to the said control electrode and electron source electrode, means for applying modulation to said rectifier, and an output coupled to said alternating current circuit.

8. In an ultra high frequency signalling system, an oscillation generator comprising a tube having an electron stream source, an accelerating electrode, a repeller electrode and at least one resonator operating at a frequency depending in part on the electron transit time within the tube, resonator dimensions and the potential on said repeller electrode, a source of modulating potentials, a source of direct potential having its positive terminal connected to said electron stream source and its negative terminal connected to said repeller electrode to set up oscillations in said generator of a certain frequency, alternating current connections coupling said source of modulating potentials between said repeller electrode and said electron stream source to modulate the timing of the oscillations generated, and apparatus for basing the operation of said system on a fixed frequency differing from said certain frequency by an amount proportional to the magnitude of peaks of the modulation comprising a rectifier in a rectifier circuit including a load resistor in shunt to said repeller electrode and said electron stream source.

9. A system as recited in claim 8 wherein said rectifier has its cathode connected to said electron stream source and its anode connected to said repeller electrode.

CHARLES A. ROSENCRANS.

REFERENCES CITED

The following references are of record in the file of this patent:

UNITED STATES PATENTS

| Number | Name | Date |
|---|---|---|
| Re. 20,506 | Soller | Sept. 14, 1937 |
| 2,169,019 | Bohm et al. | Aug. 8, 1939 |
| 2,337,214 | Tunick | Dec. 2, 1943 |